US009507656B2

(12) United States Patent
Brooks et al.

(10) Patent No.: US 9,507,656 B2
(45) Date of Patent: Nov. 29, 2016

(54) MECHANISM FOR HANDLING UNFUSED MULTIPLY-ACCUMULATE ACCRUED EXCEPTION BITS IN A PROCESSOR

(75) Inventors: Jeffrey S. Brooks, Austin, TX (US); Paul J. Jordan, Austin, TX (US); Christopher H. Olson, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 1726 days.

(21) Appl. No.: 12/424,929

(22) Filed: Apr. 16, 2009

(65) Prior Publication Data
US 2010/0268920 A1 Oct. 21, 2010

(51) Int. Cl.
G06F 11/34 (2006.01)
G06F 9/302 (2006.01)
G06F 11/07 (2006.01)
G06F 9/30 (2006.01)
G06F 9/38 (2006.01)

(52) U.S. Cl.
CPC ......... *G06F 11/0772* (2013.01); *G06F 9/3001* (2013.01); *G06F 9/30014* (2013.01); *G06F 9/3017* (2013.01); *G06F 9/30094* (2013.01); *G06F 9/30101* (2013.01); *G06F 9/3851* (2013.01); *G06F 9/3853* (2013.01); *G06F 9/3865* (2013.01); *G06F 9/3889* (2013.01)

(58) Field of Classification Search
CPC ............... G06F 9/3001; G06F 9/3861; G06F 11/0772; G06F 9/30094; G06F 9/30101; G06F 9/3865
USPC ....................................................... 712/244
See application file for complete search history.

(56) References Cited

U.S. PATENT DOCUMENTS

| 5,546,551 | A  | * | 8/1996  | Kohn ........................... 711/169 |
| 6,112,019 | A  | * | 8/2000  | Chamdani et al. ........... 712/214 |
| 6,275,838 | B1 |   | 8/2001  | Blomgren |
| 6,460,134 | B1 |   | 10/2002 | Blomgren |
| 6,557,021 | B1 |   | 4/2003  | Brooks |
| 6,594,755 | B1 | * | 7/2003  | Nuechterlein et al. ........ 712/239 |
| 6,675,292 | B2 | * | 1/2004  | Prabhu et al. ................ 712/244 |
| 6,691,223 | B1 | * | 2/2004  | Ganesan et al. .............. 712/244 |
| 6,889,241 | B2 |   | 5/2005  | Pangal |
| 7,080,111 | B2 |   | 7/2006  | Pangal |
| 7,099,910 | B2 |   | 8/2006  | Brooks |

(Continued)

OTHER PUBLICATIONS

Motorola, "M68000 Family Programmers Reference Manual", 1992, pp. 1-5 to 1-7.*

(Continued)

*Primary Examiner* — David J Huisman
(74) *Attorney, Agent, or Firm* — Meyertons, Hood, Kivlin, Kowert & Goetzel, P.C.

(57) ABSTRACT

A mechanism for handling unfused multiply-add accrued exception bits includes a processor including a floating point unit, a storage, and exception logic. The floating-point unit may be configured to execute an unfused multiply-accumulate instruction defined with the instruction set architecture (ISA). The unfused multiply-accumulate instruction may include a multiply sub-operation and an accumulate sub-operation. The storage may be configured to maintain floating-point exception state information. The exception logic may be configured to capture the floating-point exception state after completion of the multiply sub-operation and prior to completion of the accumulate sub-operation, for example, and to update the storage to reflect the floating-point exception state.

18 Claims, 5 Drawing Sheets

(56) References Cited

U.S. PATENT DOCUMENTS 7,392,273 B2 6/2008 Gerwig
2009/0248779 A1 10/2009 Brooks et al.

OTHER PUBLICATIONS

U.S. Appl. No. 12/020,486, entitled "Fused Multiply-Add Rounding and Unfused Multiply-Add Rounding in a Single Multiply-Add Module", by Murali K. Inaganti and Leonard D. Rarick, filed on Jan. 25, 2008.
U.S. Appl. No. 12/121,053, entitled "Leading Zero Estimation Modification for Unfused Rounding Catastrophic Cancellation", by Leonard D. Rarick, filed on May 15, 2008.
Schmookler, et al.; "Leading Zero Anticipation and Detection—A Comparison of Methods"; Proceedings of the 15th IEEE Symposium on Computer Arithmetic; 2001, pp. 7-12.

* cited by examiner

MECHANISM FOR HANDLING UNFUSED MULTIPLY-ACCUMULATE ACCRUED EXCEPTION BITS IN A PROCESSOR

BACKGROUND OF THE INVENTION

1. Field of the Invention

This invention relates to processors and, more particularly, to floating-point operations.

2. Description of the Related Art

In floating-point processing systems that perform multiply-accumulate operations (e.g., a multiply-add) such as A*C+B, where A, B, and C are floating-point numbers, rounding may generally be accomplished utilizing one of two techniques. The first technique may be referred to as "fused" multiply-add rounding, while the second technique may be referred to as "unfused" multiply-add rounding.

In a fused multiply-add, no rounding is performed between the multiplication operation and the subsequent addition/subtraction operation because the two operations are treated as one (fused) operation. Therefore, at most one rounding step occurs. In contrast, in the unfused case, the multiply-add operations may be treated as independent multiply and subsequent add/subtract operations with rounding being performed according to IEEE Std. 754-1985 after each of the two separate operations.

Because the multiply and add/subtract operations are treated independently in the unfused technique, it is possible for the multiply operation to cause an invalid operation, overflow, underflow, or inexact accrued exception to occur, and the corresponding current exception bits may be cleared by a subsequent add/subtract operation. Thus, the accrued exception bits within the floating-point state register, may not reflect the occurrence of the multiply operation exception if the accrued exception bits are obtained by simply OR-ing the present accrued exception bit value with the corresponding current exception bit value.

SUMMARY

Various embodiments of a mechanism for handling unfused multiply-accumulate accrued exception bits are disclosed. In one embodiment, a processor includes a floating point unit, a storage, and exception logic. The floating-point unit may be configured to execute an unfused multiply-accumulate instruction defined with the instruction set architecture (ISA). The unfused multiply-accumulate instruction may include a multiply sub-operation and an accumulate sub-operation. In one embodiment, there may be an intermediate rounding operation performed after the multiply sub-operation. The storage may be configured to maintain floating-point exception state information such as accrued exception bits and current exception bits, for example. The exception logic may be configured to capture the floating-point exception state after completion of the multiply sub-operation and prior to completion of the accumulate sub-operation, for example, and to update the storage to reflect the floating-point exception state after the multiply-accumulate instruction commits.

Figure 1:
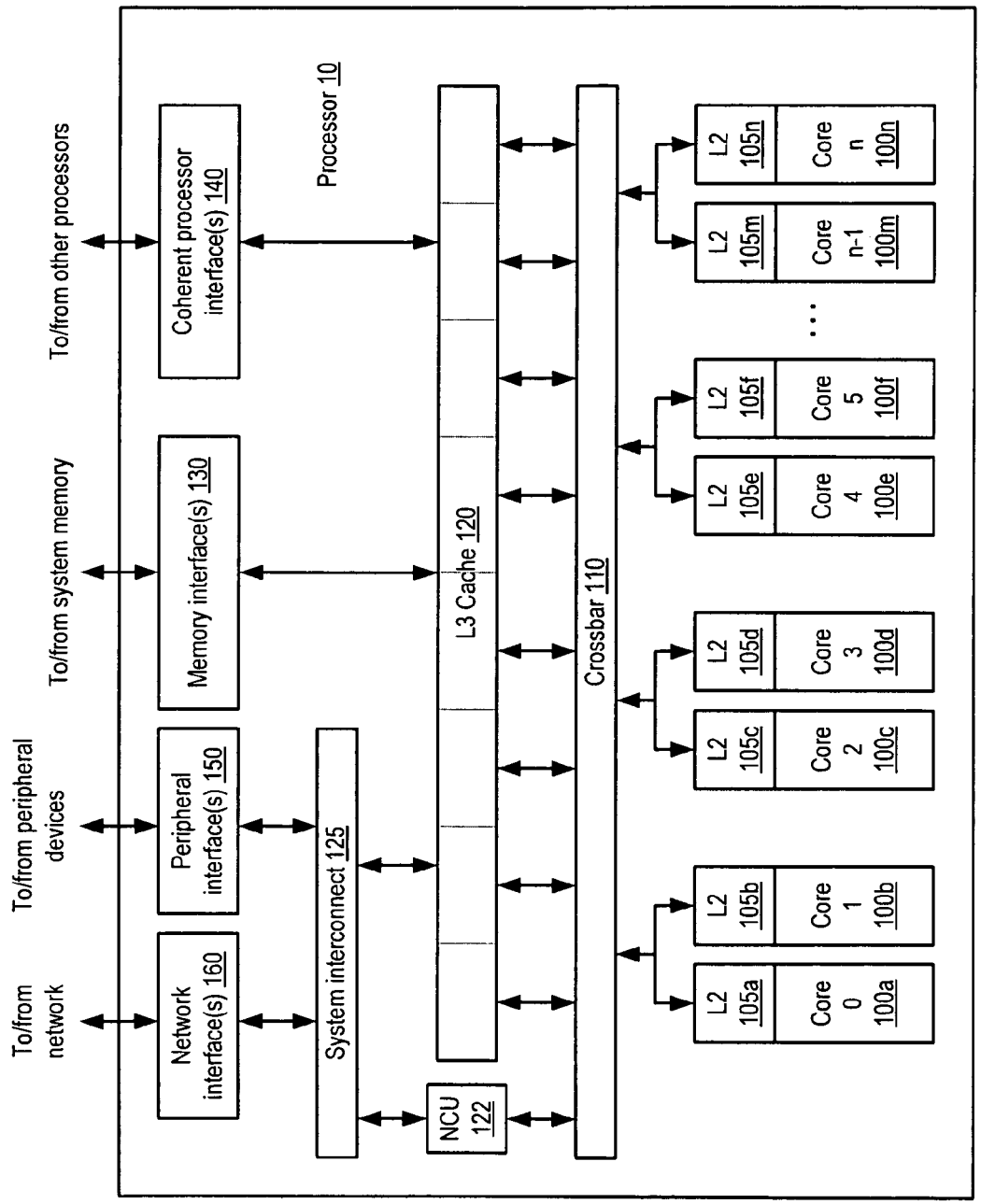
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Introduction

In the following discussion, hardware support for floating-point unfused multiply-accumulate instructions is explored. First, an overview is provided of one type of multithreaded processor in which unfused multiply-accumulate accrued exception bit handling may be provided. Next, particular embodiments of processor hardware that may be configured to handle the unfused multiply-accumulate accrued exception bits is described. Finally, an exemplary system embodiment including a processor that may implement the multiply-accumulate accrued exception bit handling is discussed.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound-completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
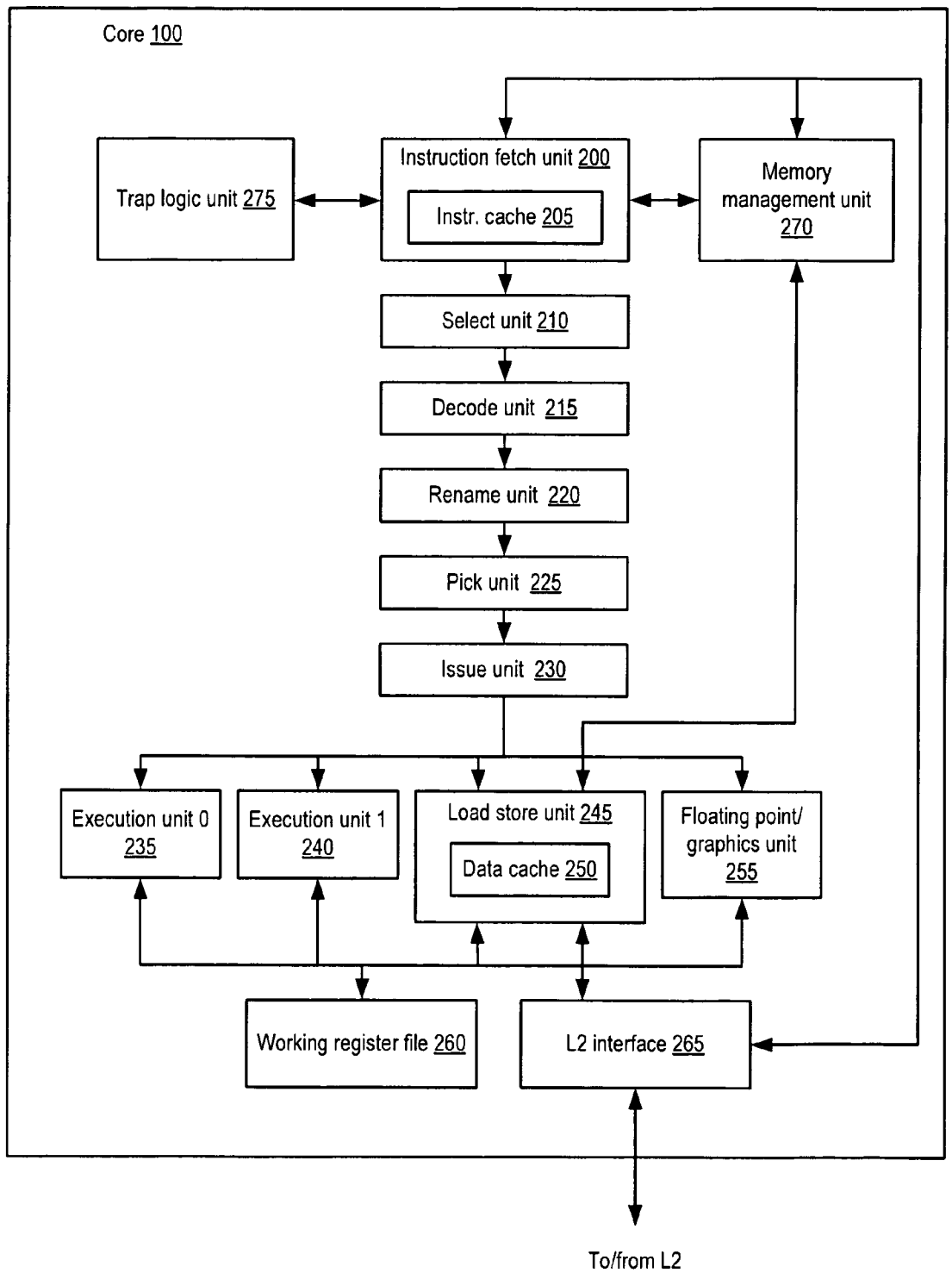
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced. As described in greater detail below, in one embodiment, the execution units may maintain floating-point status information in an architected status register.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In one embodiment, FGU 255 may implement fused and unfused floating-point multiply-add instructions. As described in greater detail below, FGU 255 may provide the appropriate exception bits to TLU 275 regardless of the operation (i.e., there may be no need to distinguish unfused multiply-accumulate operations from other operations). Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms as well as hash or checksum algorithms. FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Hardware Support for Handling of Accrued Exception Bits

As described above, during execution of an unfused multiply-accumulate instruction, it is possible for the multiply sub-operation to cause an exception. Since the corresponding current exception bits may be cleared by a subsequent add/subtract operation, unless measures are taken to preserve the exception state after the multiply sub-operation the occurrence of the multiply exception bit may be lost. For example, given the following multiply-add operation:

$$F[rd]=(SNaN*0)+0, \text{ where SNaN is a signalling Not a Number}$$

If a fused multiply-add were performed, the FSR.aexc invalid bit (nva) would be (nva=1'b1) and the FSR.cexc invalid bit (nvc) would be (nvc=1'b1), since the multiplication operation and the subsequent addition/subtraction operation are treated as one (fused) operation. Thus, the accrued exception bit accurately reflects the occurrence of an exception. However, if an unfused multiply-add operation were performed, the multiply sub-operation would cause (nvc=1'b1), and after the addition sub-operation (nvc=1'b0) and the expected FSR.aexc invalid bit (nva) would be (nva=1'b1). Since the FSR is not updated until the instruction commits, the accrued bit would not accurately reflect the occurrence of the exception. Thus, in the unfused case, some of the exception bits may be lost, since the FSR.aexc invalid bit (nva) should be (nva=1'b1), even while (nvc=1'b0) if the accrued exception bits are obtained by simply OR-ing the present accrued exception bit value with the corresponding current exception bit value.

Accordingly, in one embodiment, processor core 100 is configured to capture the occurrence of certain exception bits when traps are disabled. The exception logic is illustrated in FIG. 3.

Figure 3:
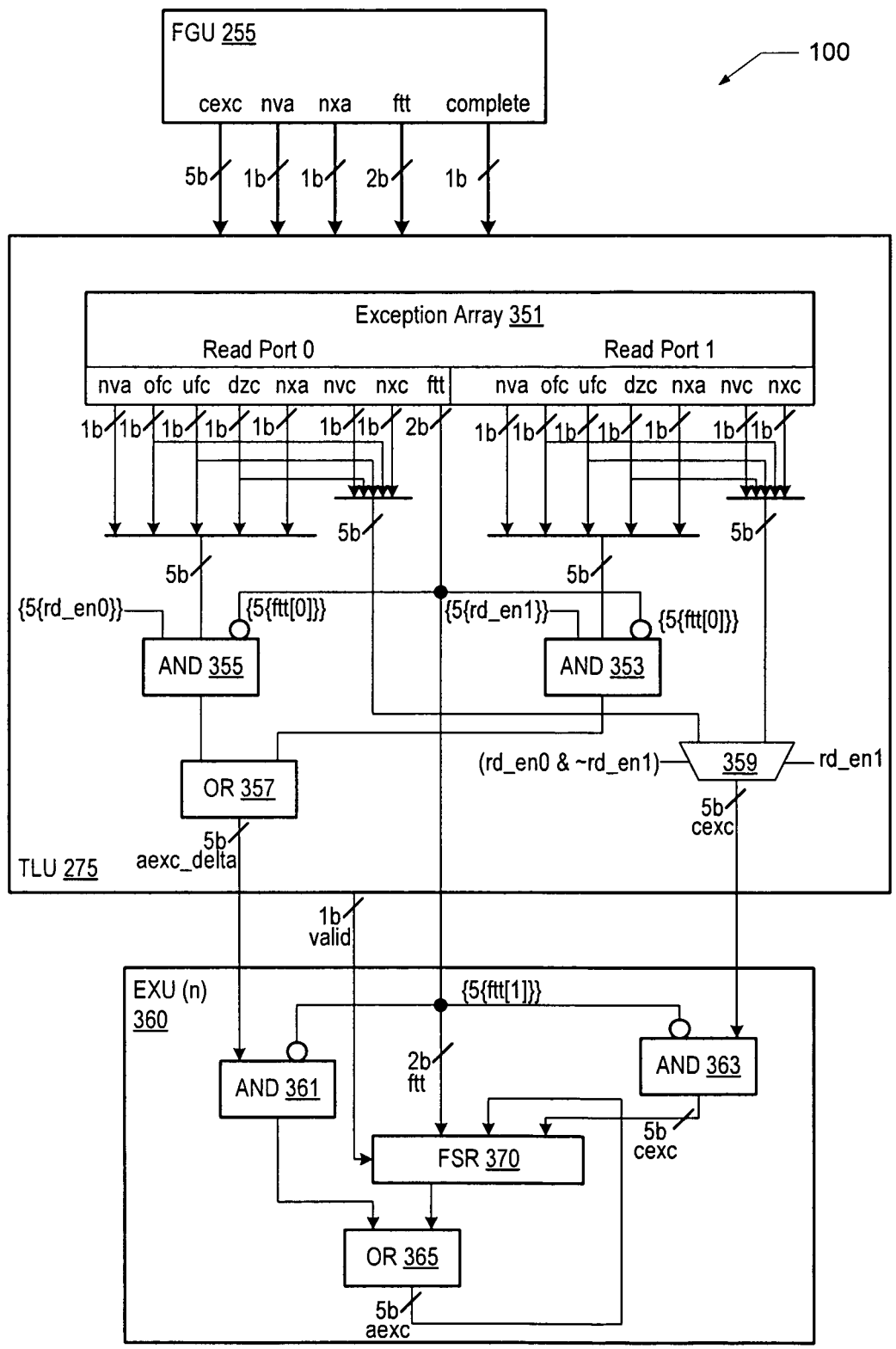
FIG. 3 is a block diagram depicting more detailed aspects of one embodiment of a processor core of the multithreaded processor of FIG. 1.

Turning to FIG. 3, a block diagram depicting more detailed aspects of portions of the embodiment of a processor core of FIG. 1 and FIG. 2 is shown. Core 100 of FIG. 3 includes portions of FGU 255 coupled to TLU 275, which is in turn coupled to EXU 360. It is noted that EXU 360 may be representative of any of the execution unit 0 or execution unit 1 of FIG. 2, for example.

As noted above, FGU 255 may be configured to execute floating-point instructions. In one embodiment, FGU 255 may be configured to execute an unfused floating-point multiply-accumulate instruction that is defined within the instruction set architecture (ISA) of the processor. In one embodiment, the FGU 255 may generate a number of floating point exceptions during execution of floating-point instructions. More particularly, the SPARC Architecture Manual version 9 defines two five-bit fields within the floating-point state register (FSR) to maintain the state of the exceptions. The two fields are: the current exception state, which is defined as FRS.cexc, and the accrued exception state, which is defined as FRS.aexc. The bits within the FSR.cexc field are defined as overflow (ofc), underflow (ufc), division-by-zero (dzc), inexact (nxc), and invalid (nvc). The accrued bits are the same except the designations uses an 'a' instead of a 'c' to denote accrued rather than current. For example, the accrued bits are designated ofa, ufa, dza, nva, and nxa. The architectural state (e.g., the cexc bits) is generally updated after a given floating-point instruction commits or retires. Thus, the cexc bits may indicate that one or more floating-point exceptions were generated by the most recently executed floating-point instruction. However, when traps are disabled, certain ones of the aexc bits accumulate the current exception bits and are thus updated by logically ORing the new cexc bits into the present aexc bits to form the updated aexc field after a floating-point instruction commits.

Accordingly, FGU 255 may provide a number of signals to TLU 275. For example, as shown in FIG. 3, FGU 255 may provide a number of exception signals that are indicative of the occurrence of particular exceptions, as well as a complete status bit and floating-point trap type bits (ftt[0] and ftt[1]). Specifically, in one embodiment, FGU 255 may provide the five current exception bits (e.g., cexc), and two accrued exception bits (e.g., nva, and nxa). In one embodiment, FGU 255 may internally capture exceptions that occur at rounding operations performed after the multiply and after the accumulate operations such that if either produces an exception the nva and nxa signals provided by FGU 255 will indicate the occurrence of the exception when the instruction completes in FGU 255. As an example, the nva bit may be the result of a logical OR between the invalid exception outputs from both rounding operations and the nxa bit may be the result of a logical OR between the invalid and inexact exception outputs from both rounding operations. However, it is contemplated that other mechanisms may be used to capture and provide the exceptions generated after the multiply sub-operation.

In the illustrated embodiment, TLU 275 includes an exception array 351, which may store the working/uncommitted state of the five current exception bits and the two accrued exception bits provided by FGU 255. In the illustrated embodiment the array 351 includes two ports, designated read port 0 and read port 1, to accommodate two instructions being executed concurrently. In one embodiment, exception array 351 may be written with the values from FGU 255 upon completion of the instructions in FGU 255, and the values may be read from the respective read port of exception array 351 upon the corresponding instruction committing.

In one embodiment, the system may trap to software when any exception other than an inexact or invalid exception occurs. Thus, when software traps are disabled (e.g., TEM=0) for specific exceptions (e.g., inexact and invalid), the system hardware handles and keeps track of (i.e., accumulates) the inexact or invalid exceptions. As such, in the illustrated embodiment, each of the AND-gates 353, 355, 361, and 363 are gated by the state of the ftt bits such that if either the ftt[0] bit or the ftt[1] bit are =1, the exception bits may be disregarded. Thus, the AND-gates are used to gate the exception bits provided by the exception array 351. The OR-gate 357 combines or consolidates the read port 0 and read port 1 bits (e.g., nva, nxa, ofc, ufc, and dzc) into a 5-bit accrued signal (e.g., aexc_delta). The multiplexer 359, selects based on which instruction commits, between the five current exception bits from read port 0 and from read port 1 and passes the selected bits to AND-gate 363, Again, if the traps are disabled, the cexc bits are passed to and update current exception bits of the FSR 370.

The aexc_delta bits are passed through AND-gate 361 if the traps are disabled, and are logically ORed (by OR-gate 365) with the present accrued bits within the FSR 370 to form the aexc bits. The aexc bits are passed to and update the accrued bits (e.g., nva, and nxa) within FSR 370 to become the new architectural state.

Accordingly, in the embodiment described above and shown in FIG. 3, when an unfused multiply-accumulate instruction (e.g., multiply-add or multiply-subtract) is executed, if an invalid or inexact exception is generated by the multiply portion or "sub-operation" the exception will cause the appropriate accrued exception bit to reflect the exception state after the multiply portion of the unfused multiply-accumulate instruction, even if the subsequent accumulate (e.g., addition or subtraction) sub-operation does not generate an exception and clears the current exception bits upon committing, which may result in the appropriate accrued bit having a value of 1, and the appropriate current bit having a value of zero within FSR 370.

Figure 4:
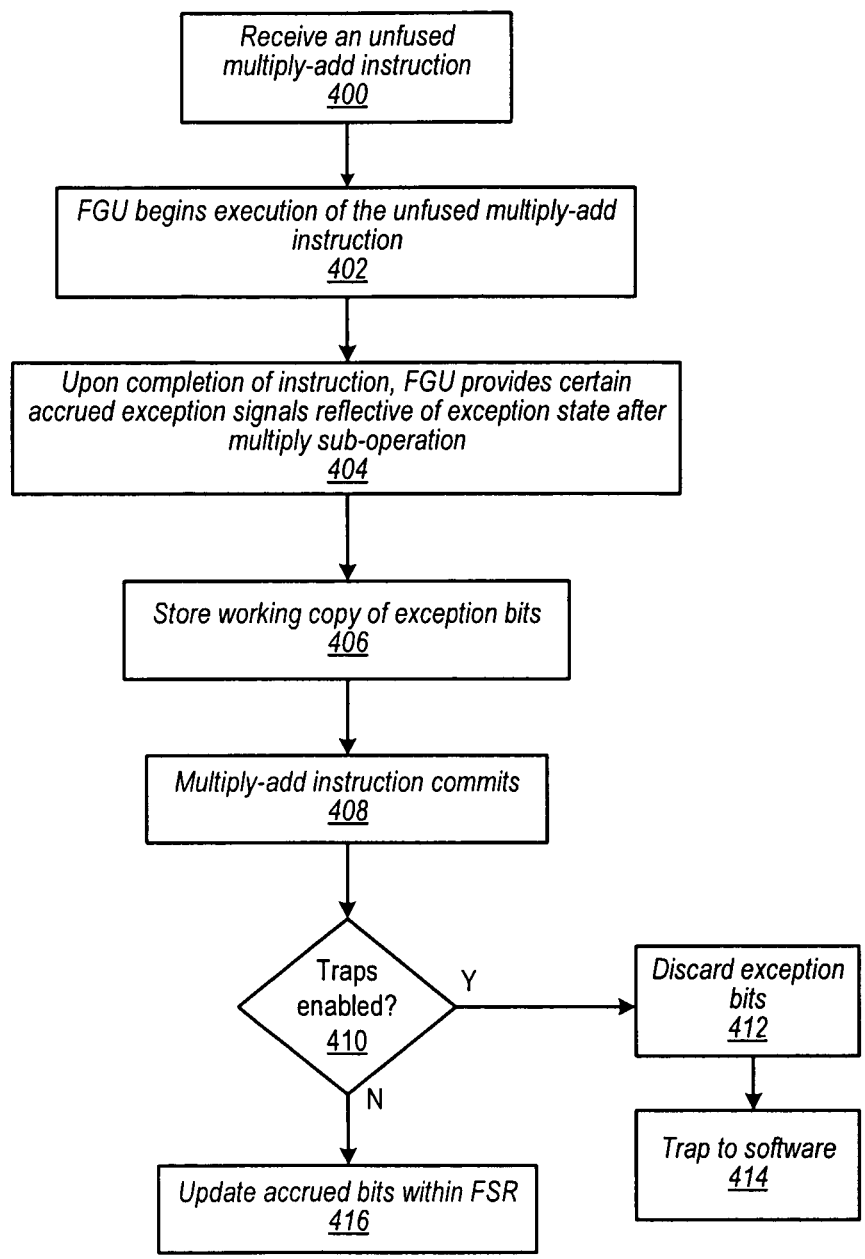
FIG. 4 is a flow diagram describing the operation of the embodiment of the processor core of FIG. 2.

In FIG. 4, a flow diagram describing a method for handling accrued exception bits in response to execution of an unfused multiply-add instruction in one embodiment of the processor core of FIG. 2 and FIG. 3 is shown. Referring collectively to FIG. 2 and FIG. 3, and beginning in block 400 of FIG. 4, an unfused multiply-add instruction is received by FGU 255. The FGU 255 begins execution of the unfused multiply-add instruction (block 402). For example, in one embodiment, the FGU 255 may employ one or more floating-point pipelines. The operands in the term (A*C)+B may be received and routed to an aligner and the multiplier. In addition, the partial products of the multiplication may be computed. Further, an intermediate rounding operation may be performed on the result of the multiplication. Exception logic within FGU 255 may provide the exception bits as described above to TLU 275 when the instruction completes (block 404). If any exceptions have occurred (e.g., invalid or inexact), the exception bits reflect the exception state after the multiply sub-operation and after the addition sub-operation.

A working/uncommitted copy of the exception bits provided by FGU 255 may be stored within a storage of exception logic of TLU 275 (e.g., exception array 351) (block 406). When the unfused multiply-add instruction commits (block 408), if there are no traps enabled for the exceptions (block 410), the exception bits may be read from the exception array 351 and exception logic within the TLU 275 and the execution units (e.g. EXU 0 or 1) may update the FSR 370 with the accrued exception bits (block 416). More particularly, as described above, the accrued exception bits may be logically OR-ed together with the present FSR state, and then loaded into FSR 370 to become the architectural state in the FSR 370. This captures and updates the FSR to reflect exceptions (in the accrued bits) that occurred after the multiply sub-operation of the unfused multiply-accumulate instruction.

However, referring back to block 410, if traps are enabled for those exceptions, the exception bits may be discarded (block 412) and the process may trap and a software exception handler may handle the exception (block 414).

Thus, by providing and capturing the exceptions generated after the multiply sub-operation (should they occur), the corresponding exception bits are not overwritten or cleared out by a subsequent addition sub-operation that does not generate any exceptions. It is noted that a multiply-add instruction was used in the exemplary embodiment of FIG. 4, it is contemplated that a multiply-subtract instruction may have also been used.

Exemplary System Embodiment

Figure 5:
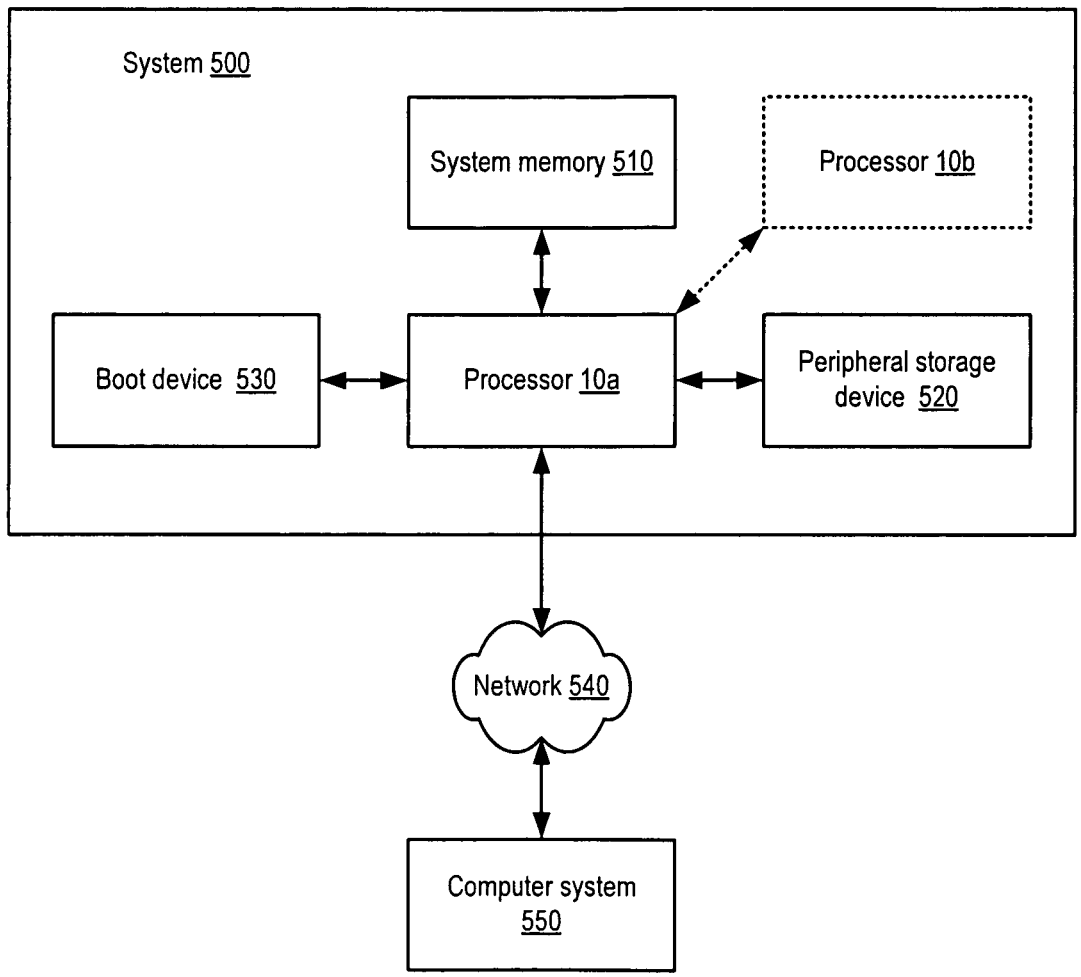
FIG. 5 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 5. In the illustrated embodiment, system 500 includes an instance of processor 10, shown as processor 10*a*, that is coupled to a system memory 510, a peripheral storage device 520 and a boot device 530. System 500 is coupled to a network 540, which is in turn coupled to another computer system 550. In some embodiments, system 500 may include more than one instance of the devices shown. In various embodiments, system 500 may be configured as a rack-mountable server system, a standalone system, or in any other suitable form factor. In some embodiments, system 500 may be configured as a client system rather than a server system.

In some embodiments, system 500 may be configured as a multiprocessor system, in which processor 10*a* may optionally be coupled to one or more other instances of processor 10, shown in FIG. 5 as processor 10*b*. For example, processors 10*a-b* may be coupled to communicate via their respective coherent processor interfaces 140.

In various embodiments, system memory 510 may comprise any suitable type of system memory as described above, such as FB-DIMM, DDR/DDR2/DDR3/DDR4 SDRAM, or RDRAM®, for example. System memory 510 may include multiple discrete banks of memory controlled by discrete memory interfaces in embodiments of processor 10 that provide multiple memory interfaces 130. Also, in some embodiments, system memory 510 may include multiple different types of memory.

Peripheral storage device 520, in various embodiments, may include support for magnetic, optical, or solid-state storage media such as hard drives, optical disks, nonvolatile RAM devices, etc. In some embodiments, peripheral storage device 520 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 520 may be coupled to processor 10 via peripheral interface(s) 150 of FIG. 1.

As described previously, in one embodiment boot device 530 may include a device such as an FPGA or ASIC configured to coordinate initialization and boot of processor 10, such as from a power-on reset state. Additionally, in some embodiments boot device 530 may include a secondary computer system configured to allow access to administrative functions such as debug or test modes of processor 10.

Network 540 may include any suitable devices, media and/or protocol for interconnecting computer systems, such as wired or wireless Ethernet, for example. In various embodiments, network 540 may include local area networks (LANs), wide area networks (WANs), telecommunication networks, or other suitable types of networks. In some embodiments, computer system 550 may be similar to or identical in configuration to illustrated system 500, whereas in other embodiments, computer system 550 may be substantially differently configured. For example, computer system 550 may be a server system, a processor-based client system, a stateless "thin" client system, a mobile device, etc. In some embodiments, processor 10 may be configured to communicate with network 540 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
 a floating-point unit configured to execute an unfused multiply-accumulate instruction defined with an instruction set architecture, wherein the unfused multiply-accumulate instruction includes a multiply sub-operation and an accumulate sub-operation;
 a storage configured to maintain floating-point exception state information; and
 exception logic including a storage array and configured to capture uncommitted floating-point exception state within the storage array after completion of the multiply sub-operation and prior to completion of the accumulate sub-operation, and to update the storage, after the unfused multiply-accumulate instruction commits, with the floating-point exception state from the storage array;
 wherein the storage array includes a first port and a second port; and
 wherein the exception logic is further configured to:
  read exception information for a first unfused multiply-accumulate instruction defined in the instruction set architecture from the first port in response to a determination that the first unfused multiply-accumulate instruction has committed;
read exception information for a second unfused multiply-accumulate instruction defined the in the instruction set architecture from the second port in response to a determination that the second unfused multiply-accumulate instruction has committed;
select one of the exception information for the first unfused multiply-accumulate instruction and the exception information for the second unfused multiply-accumulate instruction dependent upon which of the first unfused multiply-accumulate instruction and the second unfused multiply-accumulate instruction commits; and
determine an architectural state dependent upon the selected exception information;
wherein the first unfused multiply-accumulate instruction and the second unfused multiply-accumulate instruction are concurrently executed.

2. The processor as recited in claim 1, wherein the floating-point unit is configured to provide one or more exception signals corresponding to one or more respective exceptions generated in response to execution of each of the multiply sub-operation and the accumulate sub-operation.

3. The processor as recited in claim 1, wherein the floating-point exception state information includes accrued exception bits and current exception bits.

4. The processor as recited in claim 3, wherein the floating-point unit is further configured to generate one or more particular accrued exception bits and one or more current exception bits that are indicative of the floating-point exception state after the multiply sub-operation and the accumulate sub-operation.

5. The processor as recited in claim 4, wherein, to generate a given accrued exception bit, the exception logic is configured to perform a logical OR operation between a first exception signal generated after execution of the multiply sub-operation and a second exception signal generated after execution of the accumulate sub-operation.

6. The processor as recited in claim 3, wherein the exception logic is further configured to discard floating-point exception bits corresponding to the floating-point exception state prior to updating the storage in response to one or more exception traps being enabled.

7. The processor as recited in claim 1, wherein the floating-point unit is configured to execute a first instruction before a second instruction, wherein the second instruction occurs before the first instruction in program order.

8. The processor as recited in claim 1, wherein the floating-point exceptions are defined in the IEEE Standard 754-1985.

9. The processor as recited in claim 1, wherein during execution of an unfused multiply-accumulate instruction, the floating-point unit is further configured to perform a first rounding operation subsequent to the multiply sub-operation and a second rounding operation subsequent to the accumulate sub-operation.

10. A system comprising:
a system memory; and
a processor coupled to the system memory;
wherein the processor includes:
a floating-point unit configured to execute an unfused multiply-accumulate instruction defined with an instruction set architecture, wherein the unfused multiply-accumulate instruction includes a multiply sub-operation and an accumulate sub-operation;
a storage configured to maintain floating-point exception state information; and
exception logic including a storage array and configured to capture uncommitted floating-point exception state within the storage array after completion of the multiply sub-operation and prior to completion of the accumulate sub-operation, and to update the storage, after the unfused multiply-accumulate instruction commits, with the floating-point exception state from the storage array;
wherein the storage array includes a first port and a second port; and
wherein the exception logic is further configured to:
read exception information for a first unfused multiply-accumulate instruction defined in the instruction set architecture from the first port in response to a determination that the first unfused multiply-accumulate instruction has committed;
read exception information for a second unfused multiply-accumulate instruction defined in the instruction set architecture from the second port in response to a determination that the second unfused multiply-accumulate instruction has committed;
select one of the exception information for the first unfused multiply-accumulate instruction and the exception information for the second unfused multiply-accumulate instruction dependent upon which of the first unfused multiply-accumulate and the second unfused multiply-accumulate instruction commits; and
determine an architectural state dependent upon the selected exception information;
wherein the first unfused multiply-accumulate instruction and the second unfused multiply-accumulate instruction are concurrently executed.

11. A method comprising:
a floating-point unit of a processor executing an unfused multiply-accumulate instruction defined with an instruction set architecture, wherein the unfused multiply-accumulate instruction includes a multiply sub-operation and an accumulate sub-operation;
maintaining floating-point exception state information within a storage; and
exception logic capturing uncommitted floating-point exception state within a storage array of the exception logic after completion of the multiply sub-operation and prior to completion of the accumulate sub-operation, and updating the storage, after the unfused multiply-accumulate instruction commits, with the floating-point exception state from the storage array;
wherein the storage array includes a first port and a second port; and
wherein the exception logic is further configured to:
read exception information for a first unfused multiply-accumulate instruction defined in the instruction set architecture from the first port in response to a determination that the first unfused multiply-accumulate instruction has committed;
read exception information for a second unfused multiply-accumulate instruction defined in the instruction set architecture from the second port in response to a determination that the second unfused multiply-accumulate instruction as committed;
select one of the exception information for the first unfused multiply-accumulate instruction and the exception information for the second unfused multiply-accumulate instruction dependent upon which of the first unfused multiply-accumulate instruction and the second unfused multiply-accumulate instruction commits; and determine an architectural state dependent upon the selected exception information;

wherein the first unfused multiply-accumulate instruction and the second unfused multiply-accumulate instruction are concurrently executed.

12. The method as recited in claim 11, further comprising the floating-point unit providing one or more exception signals corresponding to one or more respective exceptions generated in response to execution of each of the multiply sub-operation and the accumulate sub-operation.

13. The method as recited in claim 11, wherein the floating-point exception state information includes accrued exception bits and current exception bits.

14. The method as recited in claim 13, further comprising the exception logic discarding floating-point exception bits corresponding to the floating-point exception state prior to updating the storage in response to one or more exception traps being enabled.

15. The method as recited in claim 11, further comprising the floating-point unit generating one or more particular accrued exception bits and one or more current exception bits that are indicative of the floating-point exception state after the multiply sub-operation and the accumulate sub-operation.

16. The method as recited in claim 15, wherein, generating a given accrued exception bit includes the exception logic performing a logical OR operation between a first exception signal generated after execution of the multiply sub-operation and a second exception signal generated after execution of the accumulate sub-operation.

17. The method as recited in claim 11, wherein during execution of an unfused multiply-accumulate instruction, the floating-point unit performs a first rounding operation subsequent to the multiply sub-operation and a second rounding operation subsequent to the accumulate sub-operation.

18. The method as recited in claim 11, further comprising the floating-point unit executing a first instruction before a second instruction, wherein the second instruction occurs before the first instruction in program order.

* * * * *

UNITED STATES PATENT AND TRADEMARK OFFICE
CERTIFICATE OF CORRECTION

PATENT NO. : 9,507,656 B2
APPLICATION NO. : 12/424929
DATED : November 29, 2016
INVENTOR(S) : Brooks et al.

It is certified that error appears in the above-identified patent and that said Letters Patent is hereby corrected as shown below:

On the Title Page

Column 2, under Other Publications, Line 1, delete "Programmers" and insert -- Programmer's --, therefor.

In the Claims

In Column 19, Line 4, in Claim 1, after "defined" delete "the".

Signed and Sealed this
Twentieth Day of June, 2017

Joseph Matal
*Performing the Functions and Duties of the
Under Secretary of Commerce for Intellectual Property and
Director of the United States Patent and Trademark Office*